(12) United States Patent
Anderson et al.

(10) Patent No.: US 12,119,689 B2
(45) Date of Patent: Oct. 15, 2024

(54) ADAPTER FOR A PORTABLE BARCODE READER AND PORTABLE SCANNING SYSTEM

(71) Applicant: ZEBRA TECHNOLOGIES CORPORATION, Lincolnshire, IL (US)

(72) Inventors: Mark D. Anderson, Dix Hills, NY (US); Gennaro Squillante, Centereach, NY (US); Michael P. Steele, Wantagh, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 499 days.

(21) Appl. No.: 17/501,941

(22) Filed: Oct. 14, 2021

(65) Prior Publication Data
US 2023/0119670 A1   Apr. 20, 2023

(51) Int. Cl.
*H01M 10/46* (2006.01)
*G06K 7/10* (2006.01)
*G06K 7/14* (2006.01)
*H02J 7/00* (2006.01)
*H02J 7/02* (2016.01)
*H02J 50/10* (2016.01)

(52) U.S. Cl.
CPC ........ *H02J 7/0044* (2013.01); *G06K 7/10881* (2013.01); *G06K 7/1413* (2013.01); *H02J 7/02* (2013.01); *H02J 50/10* (2016.02); *G06K 2007/10524* (2013.01)

(58) Field of Classification Search
CPC ........ H02J 7/0042; H02J 7/0044; H02J 5/005; H02J 5/10; H02J 5/80; H02J 5/90; H02J 7/02; H02J 50/005; H02J 50/10; H02J 50/80; G06K 7/1413; G06K 7/10881; G06K 2007/10524

USPC ................ 320/107, 108, 114, 115
See application file for complete search history.

(56) References Cited

U.S. PATENT DOCUMENTS

| 10,896,300 B2 * | 1/2021 | Antonetti ........... G06K 7/10297 |
| 2016/0094070 A1 * | 3/2016 | Mazzone .............. H02J 7/0044 320/115 |
| 2016/0204636 A1 * | 7/2016 | Allen .................... H02J 7/0044 320/114 |

FOREIGN PATENT DOCUMENTS

| AU | 2022281230 A1 * | 11/2023 | ......... G06K 7/10881 |
| CA | 2983119 A1 * | 11/2016 | ......... G06K 7/10881 |
| EP | 1998423 A2 * | 12/2008 | .............. H02J 50/10 |

* cited by examiner

*Primary Examiner* — Edward Tso
(74) *Attorney, Agent, or Firm* — Yuri Astvatsaturov

(57) ABSTRACT

An adapter for a portable barcode reader includes a body having a base for selective placement on an external surface, adapter electrical contacts contained within the body and positioned to be in continuous electrical contact with reader electrical contacts of the portable barcode reader in a fastened state, a wireless charging receiver conductor coupled to the adapter electrical contacts, and a wireless controller configured to control charging of the portable barcode reader. The adapter maintains the portable barcode reader in a stationary position when placed on a surface such that the field of view of the portable barcode reader extends from horizontal to as much as 45 degrees below horizontal. The adapter may further include a near-field communication conductor and a microcontroller to wirelessly communicate indicia data captured by the portable barcode reader to an external receiver.

19 Claims, 6 Drawing Sheets

ADAPTER FOR A PORTABLE BARCODE READER AND PORTABLE SCANNING SYSTEM

BACKGROUND

Portable barcode readers and/or scanning devices may be used in various environments such as, for example, warehouse environments, checkout stations, and/or other similar settings. Many of these scanning devices utilize mechanical contacts to make electrical connections for battery charging and other communication functions. However, the mechanical contacts are subject to contact wear, are sensitive to dirt, and can be mechanically misaligned with corresponding contacts of a charger, all of which may limit or prevent charging of the portable barcode reader and/or communication via the portable barcode reader. To eliminate these challenges, newer models are often designed for wireless charging and wireless communication. Wireless features are unavailable on older models still in use.

SUMMARY

In accordance with a first aspect, an adapter for a portable barcode reader is configured to capture at least one image of an object appearing in a field of view (FOV) having a central axis. The adapter has a body having a base for selective placement on an external surface, and the body is configured to fasten around a foot of the portable barcode reader to maintain the barcode reader in a stationary position when selectively placed on the external surface. The central axis of the FOV of the portable barcode reader extends anywhere between a horizontal plane to a plane as much as 45 degrees below the horizontal plane when the base is selectively placed on the external surface. The adapter further has adapter electrical contacts contained within the body and positioned to be in continuous electrical contact with reader electrical contacts of the foot of the portable barcode reader when the body is fastened around the foot of the portable barcode reader. The adapter also has a wireless charging receiver conductor positioned within the body and coupled to the adapter electrical contacts to provide inductively received power to the portable barcode reader. Additionally, the adapter has a wireless controller positioned within the body and in communication with the wireless charging receiver conductor and the adapter electrical contacts and configured to control charging of the portable barcode reader.

In a variation, the body may have a plurality of parts adapted to move between an open state, in which the plurality of parts are separated to enable the portable barcode reader to be inserted into the adapter, and a fastened state, in which the plurality of parts are secured around the portable barcode reader such that the adapter moves with the portable barcode reader during use. In some examples, the plurality of parts may include a first half and a second half, an enclosure created between the first half and the second half in the fastened state, the enclosure having an enclosure geometry that is complementary to an exterior surface of the foot of the portable barcode reader. In some approaches, the adapter may further include a receptacle region within which any of a plurality of inserts may be placed, each insert being shaped to marry with a different foot geometry of the portable barcode reader, the insert securable within the body of the adapter and adjacent to an exterior surface of the portable barcode reader when the adapter is in the fastened state.

Further, in some approaches, the body of the adapter may include internal alignment structures that engage an exterior surface of the portable barcode reader to ensure proper placement of the portable barcode reader within the body of the adapter.

In other examples, the base may include a bottom that is selectively placed on the surface and an adjustable ratchet by which the FOV of the barcode reader can be adjusted when the base is selectively placed on the surface by changing an angle between the bottom and the surface.

In still other examples, the adapter may further include a near-field communication (NFC) conductor positioned within the body, and a microcontroller in communication with the NFC conductor, and the wireless controller, and the adapter electrical contacts, the microcontroller may be configured to wirelessly communicate indicia data captured by the portable barcode reader to an external receiver.

In a variation, the base may include a bottom that is contoured to be complementary to the surface upon which the base is configured for selective placement.

In accordance with a second aspect, an adapter for a portable barcode reader is configured to enable wireless charging and data transfer between the portable barcode reader and a charge pad. The adapter includes a body having a base, the body configured to fasten to the portable barcode reader. The adapter further includes adapter electrical contacts contained within the body and positioned to be in continuous contact with reader electrical contacts of the barcode reader when the body is fastened to the barcode reader. The adapter also includes a wireless charging receiver conductor positioned within the body and coupled to the adapter electrical contacts to provide inductively received power to the portable barcode reader. The adapter further includes a wireless controller positioned within the body and in communication with the wireless charging receiver conductor and the adapter electrical contacts and configured to control charging of the portable barcode reader. In addition, the adapter includes a near-field communication (NFC) conductor positioned within the body, and a microcontroller positioned within the body and in communication with the NFC conductor, the wireless controller, and the adapter electrical contacts. The microcontroller is configured to wirelessly communicate indicia data captured by the portable barcode reader to an external receiver.

In a variation, the adapter may include an adapter indicator in communication with the microcontroller, the adapter indicator configured to provide at least one of a visual signal and audial signal regarding a status of the adapter. In some approaches, the status may be one of: a successful pairing between the NFC conductor and the charge pad, a failed pairing between the NFC conductor and the charge pad, a successful Bluetooth connection between the portable barcode reader and the charge pad, a failed Bluetooth connection between the portable barcode reader and the charge pad, a level of charge, currently charging, and currently not charging.

In accordance with a third aspect, a portable scanning system includes a barcode reader having reader electrical contacts, an adapter, and a charge pad. The adapter has a body configured to fasten to the barcode reader and adapter electrical contacts contained within the body and positioned to be in continuous contact with the reader electrical contacts of the barcode reader when the body is fastened to the barcode reader. The adapter further has a wireless charging receiver conductor positioned within the body and coupled to the adapter electrical contacts to provide inductively received power to the portable barcode reader, and a wireless controller positioned within the body and in communication with the wireless charging receiver conductor and the adapter electrical contacts and configured to control charging of the portable barcode. The charge pad has a wireless charging transmitter conductor and a power source connection. The barcode reader is configured to be charged via direct charging between the reader electrical contacts and the adapter electrical contacts, wireless charging between the wireless charging receiver conductor and the wireless charging transmitter conductor, and direct charging between the charge pad and a power source by the power source connection.

In some variations, the charge pad may be a Qi pad.

In some approaches, the adapter may further include a near-field communication (NFC) conductor positioned within the body, and a microcontroller in communication with the NFC conductor, the wireless controller, and the adapter electrical contacts. The microcontroller may be configured to wirelessly communicate indicia data captured by the portable barcode reader to an external server.

In other examples, the charge pad may include a pad indicator, the pad indicator configured to provide at least one of a visual signal and audial signal regarding a status of the portable scanning system. In some examples, the status may be one of: a successful pairing between the NFC conductor and the charge pad, a failed pairing between the NFC conductor and the charge pad, a successful Bluetooth connection between the portable barcode reader and the charge pad, a failed Bluetooth connection between the portable barcode reader and the charge pad, a level of charge, currently charging, and currently not charging.

In still further examples, the charge pad may include physical or visual guides to direct placement of the adapter on the charge pad.

In additional examples, the charge pad may be connected to a host server through one or more interfaces.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
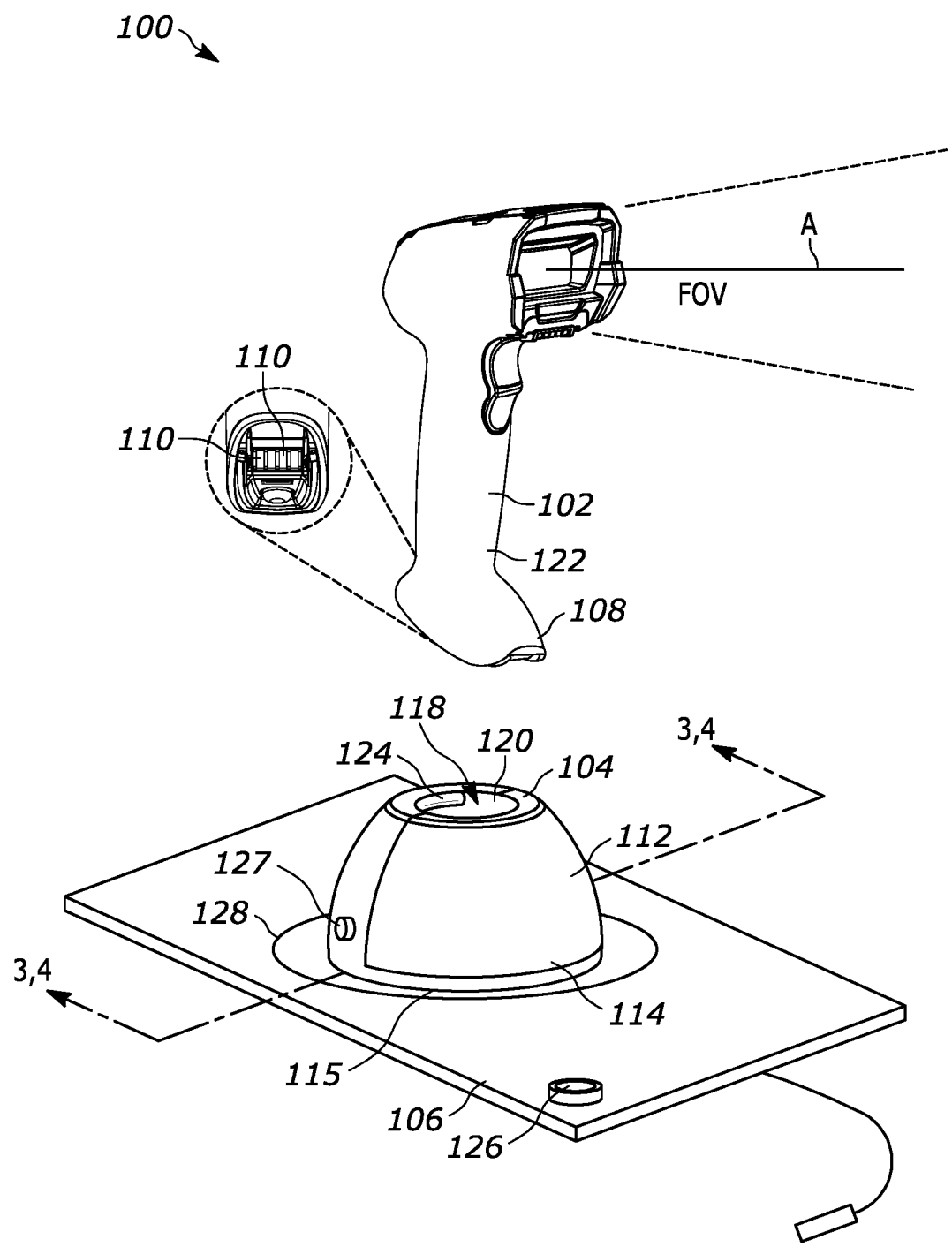
FIG. 1 illustrates a portable scanning system including a barcode reader having reader electrical contacts, an adapter, and a charge pad.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, an adapter for a portable barcode reader having electrical contacts is disclosed. The adapter is part of a portable charging system including the barcode reader and a charge pad. The adapter includes adapter electrical contacts to contact the electrical contacts of the barcode reader, and the adapter further includes a wireless charging receiver and a wireless controller to provide inductively received power from the charge pad to the portable barcode reader. Optionally, the adapter may further include an NFC conductor and a microcontroller to wirelessly communicate indicia data captured by the portable barcode reader to an external server. Advantageously, the adapter eliminates the performance issues created by the electrical contacts of the barcode reader. Furthermore, the adapter is field upgradable, meaning that existing barcode readers do not have to be removed from use in order to have the adapter attached. Instead, attachment of the adapter is straightforward and can be completed wherever the barcode reader is located.

Turning to FIG. 1, a portable scanning system 100 includes a barcode reader 102, an adapter 104, and a charge pad 106. The barcode reader 102 has a foot 108 having reader electrical contacts 110 and is configured to capture at least one image of an object appearing in a field of view (FOV) having a central axis A. In other arrangements not depicted here, the barcode reader 102 may have a different design without an identifiable foot 108. For example, the barcode reader 102 may have a rectangular shape like a cell phone, and the reader electrical contacts 110 may then be on any exterior surface of that shape.

The adapter 104 has a body 112 having a base 114 for selectively placement on an external surface, such as the charge pad 106. The base 114 comprises a bottom 115 that is contoured to be complementary to the surface upon which the base 114 is configured for selective placement. In the arrangement shown in FIG. 1, the charge pad 106 upon which the base 114 is placed is flat (for example, a Qi pad) so the bottom 115 is also flat. However, in other arrangements not depicted herein, the charge pad 106 may include curvatures or an uneven topography or may be structured as a raised cradle, and the bottom 115 would then be so shaped so as to be complementary to the charge pad 106 or any other surface upon which the barcode reader 102 and adapter 104 are intended to be placed. When the base 114 is selectively placed on the external surface (such as the charger 106), the central axis A of the FOV of the portable barcode reader 100 extends anywhere between a horizontal plane to a plane as much as 45 degrees below the horizontal plane when the base is selectively placed on the external surface. Because the base 114 is contoured to be complementary to the surface upon which the base 114 is configured for selective placement, the central axis A of the FOV of the portable barcode reader 100 is not necessarily directly impacted by the shape or position of the external surface because the base can offset any undesired tilt or slant of the external surface. For example, if the external surface is at a 15 degree angle, the base 115 can have a complementary angle of 15 degrees that effectively prevents the angle of the external surface from impacting the FOV.

The body 112 of the adapter 104 is configured to fasten around the foot 108 of the barcode reader 102 to maintain the barcode reader 102 in a stationary position when selectively placed on the external surface, such as the charge pad 106. As discussed above, in other arrangements not depicted herein, the barcode reader 102 may not include a foot and the body 112 may then be configured to fasten around whichever area of the barcode reader 102 includes the reader electrical contacts 110.

Figure 2:
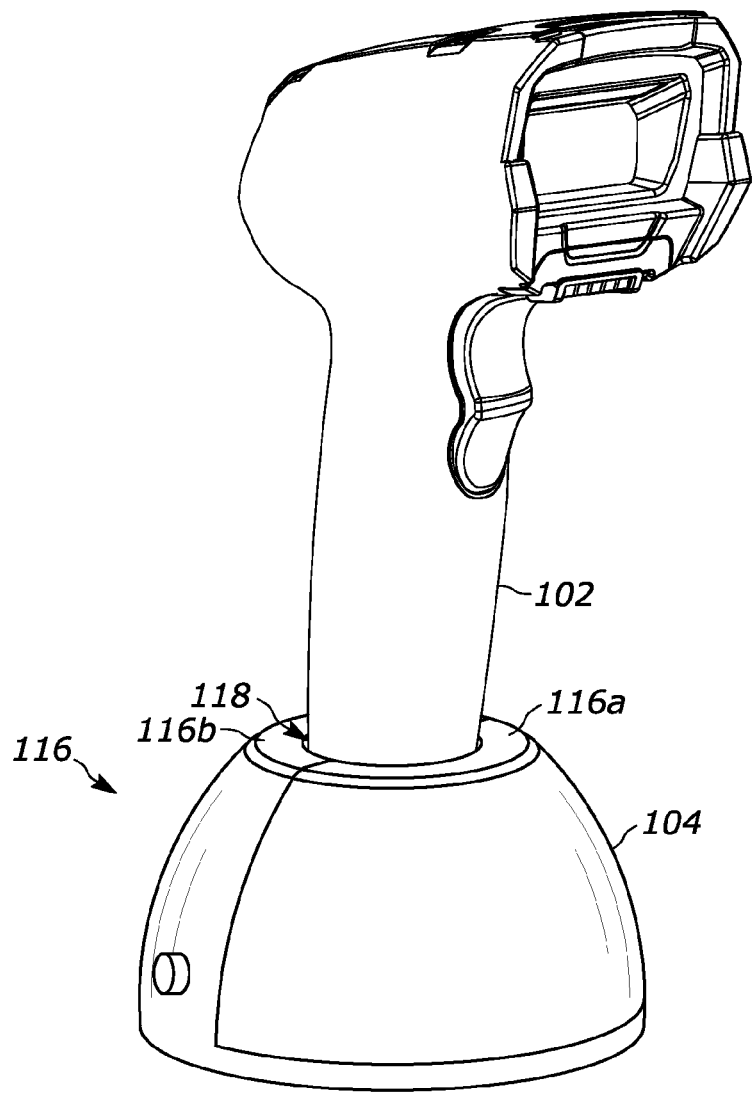
FIG. 2 illustrates the barcode reader and the adapter of FIG. 1 with the adapter in a fastened state around the foot of the barcode reader.

Turning to FIG. 2, the body 112 has a plurality of parts 116 adapted to move between an open state (not depicted), in which the plurality of parts 116 are separated to enable the barcode reader 102 to be inserted into the adapter 104, and a fastened state (shown in FIG. 2), in which the plurality of parts 116 are secured around the barcode reader 102 such that the adapter 104 moves with the portable barcode reader 102 during use. Specifically, in the arrangement shown in FIG. 2, the plurality of parts 116 includes a first half 116a and a second half 116b. An enclosure 118 (best shown in FIG. 1) is created between the first half 116a and the second half 116b in the fastened state. In other arrangements not depicted herein, the plurality of parts 116 may include more than two parts, and the enclosure 118 may be formed by however many parts the plurality of parts 116 includes.

Returning to FIG. 1, the enclosure 118 has an enclosure geometry 120 that is complementary to an exterior surface 122 of the barcode reader 102. In the arrangement shown, the exterior surface 122 is that of the foot 108. However, as discussed above, some barcode readers 102 might have the reader electrical contacts 110 somewhere other than a foot 108, and the enclosure 118 would then be complementary to the exterior surface 122 adjacent the reader electrical contacts 110. The body of the adapter 112 may further include internal alignment structures 124 that engage an exterior surface of the barcode reader 102 to ensure proper placement of the barcode reader 102 within the body 112 of the adapter 104. Examples of internal alignment structures 124 include contoured surfaces, sloped surfaces, ridges, asymmetries within the enclosure geometry 120 formed by plurality of parts 116, and projections or recesses that are complementary to the exterior surface 122 of the portable barcode reader 102. In short, internal alignment structures 124 include the features of the adapter 104 that direct the placement of the barcode reader 102 and/or make it such that there is only one possible orientation of the barcode reader 102.

The charge pad 106, shown in FIG. 1, may be either simple or complex. For example, the charge pad 106 may be a Qi pad or may instead be a custom pad designed specifically to work with the barcode reader 102 and/or adaptor 104. The charge pad 106 may include a pad indicator 126. The pad indicator 126 is configured to provide at least one of a visual signal and an audial signal regarding a status of the portable scanning system. Example visual signals would include a light that turns on, changes color, or provides a written status. Audial signals include voice announcements, beeps, or other identifiable noises indicating a status. The charge pad 106 may include physical or visual guides 128, such as ridges or lines, to direct placement of the adapter 104 on the charge pad 106.

Like the charge pad 106, as shown in FIG. 1, the adapter 104 may also have an adapter indicator 127. The adapter indicator is configured to provide at least one of a visual signal and an audial signal regarding a status of the portable scanning system. Example visual signals would include a light that turns on, changes color, or provides a written status. Audial signals include voice announcements, beeps, or other identifiable noises indicating a status.

Figure 3:
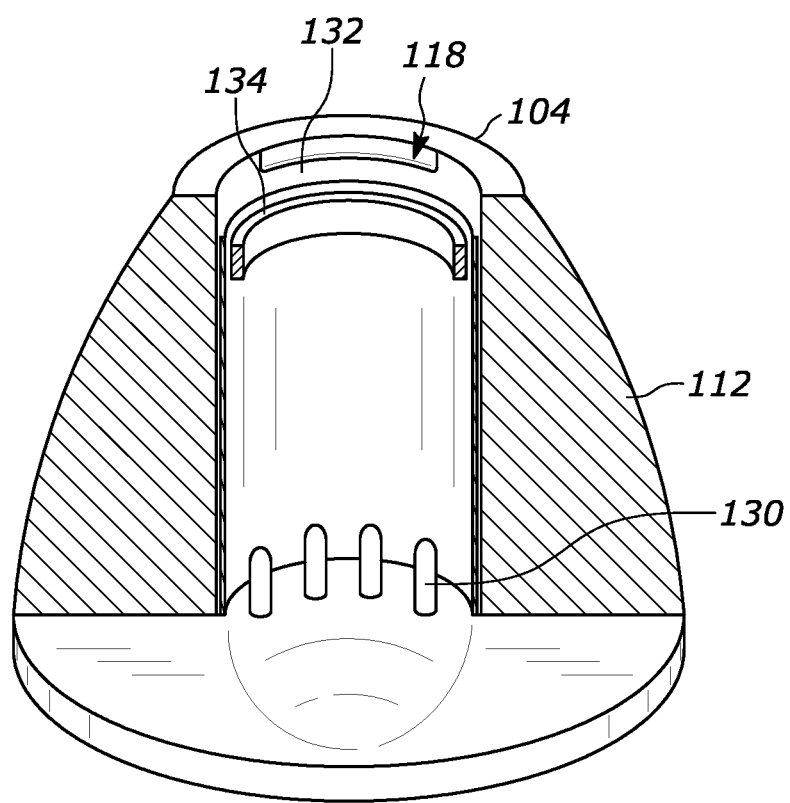
FIG. 3 is a side isometric cross-sectional view of the adapter of FIG. 1 taken along line 3,4.

FIG. 3 shows a side isometric cross-sectional view of the adapter 104 taken along the line 3,4 in FIG. 1. As shown in FIG. 3, the adapter 104 includes adapter electrical contacts 130 within the body 112. The adapter electrical contacts 130 are positioned to be in continuous electrical contact with the reader electrical contacts 110 of the barcode reader 102 (shown in FIG. 1) when the body 112 of the adapter and the barcode reader 102 are in a fastened state. The plurality of parts 116 that are secured around the barcode reader 102 in a fastened state (as shown in FIG. 2) and/or the enclosure geometry 120 and/or the internal alignment structures 124 (shown in FIG. 1) of the adapter 104 prevent mechanical misalignment of the reader electrical contacts 110 and the adapter electrical contacts 130. Because the reader electrical contacts 110 and the adapter electrical contacts 130 are in constant contact, the reader electrical contacts 110 are not subject to the same wear that is experienced without an adapter when being intermittently connected. Similarly, the constant contact prevents dirt or debris from entering the adapter 104 and interfering with the contact between the reader electrical contacts 110 and the adapter electrical contacts 130. To further prevent dirt and debris from entering the adapter 104, and to ensure a snug fit between the adapter 104 and the barcode reader 102, the adapter 104 may include a seal 132 engaged between the body 112 of the adapter 104 and the barcode reader 102 when the adapter 104 is in the fastened state. The seal 132 may be a gasket or a rubber lining or any other structure configured to plug gaps between the adapter 104 and the barcode reader 102.

FIG. 3 includes a cross-sectional view of an insert 134 in the enclosure 118 (also identified as a receptacle region 118) of the adapter 104. The insert 134 is an optional component that further improves the fit between the adapter 104 and the barcode reader 102. Barcode readers 102 come in many different models and may have different geometries of their foot 108 or of the general area where the reader electrical contacts 110 are located. A universal adapter 104 may come with a plurality of inserts 134, each of which can be placed within the enclosure 118 of the adapter 104 to make the enclosure geometry complementary to the exterior surface 122 of the specific model of barcode reader 102 to be used with the universal adapter 104. That is, each insert 134 of the plurality is shaped to marry with a different foot geometry (or other external geometry) of the portable barcode reader 102. Each insert 134 is securable within the body 112 of the adapter 104 and is adjacent to the exterior surface 122 of the portable barcode reader 102 when the adapter 104 is in the fastened state.

Figure 4:
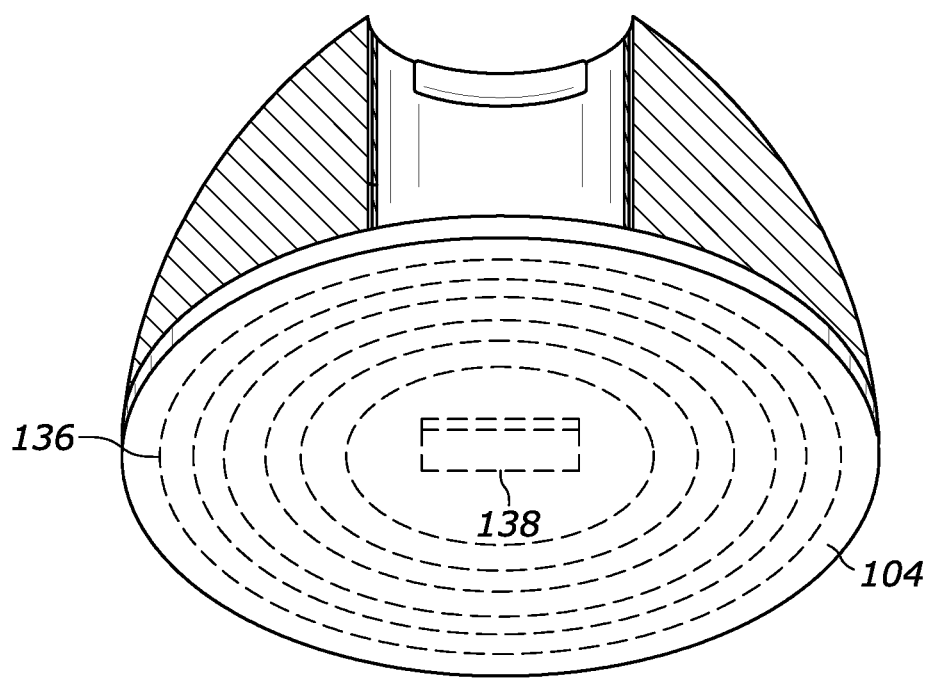
FIG. 4 is a bottom isometric cross-sectional view of the adapter of FIG. 1 taken along the line 3,4.

FIG. 4 shows a bottom isometric cross-sectional view of the adapter 104 taken along the line 3,4 in FIG. 1. As shown in FIG. 4, the adapter 104 further includes a wireless charging receiver conductor 136 positioned within the body 112. The wireless charging receiver conductor 136 is coupled to the adapter electrical contacts 130 (shown in FIG. 3) to provide inductively received power to the barcode reader 102 via the reader electrical contacts 110. A wireless controller 138 is also positioned within the body 112 of the adapter 104. The wireless controller 138 is in communication with the wireless charging receiver conductor 136 and the adapter electrical contacts 130 and is configured to control charging of the barcode reader 102.

Figure 5:
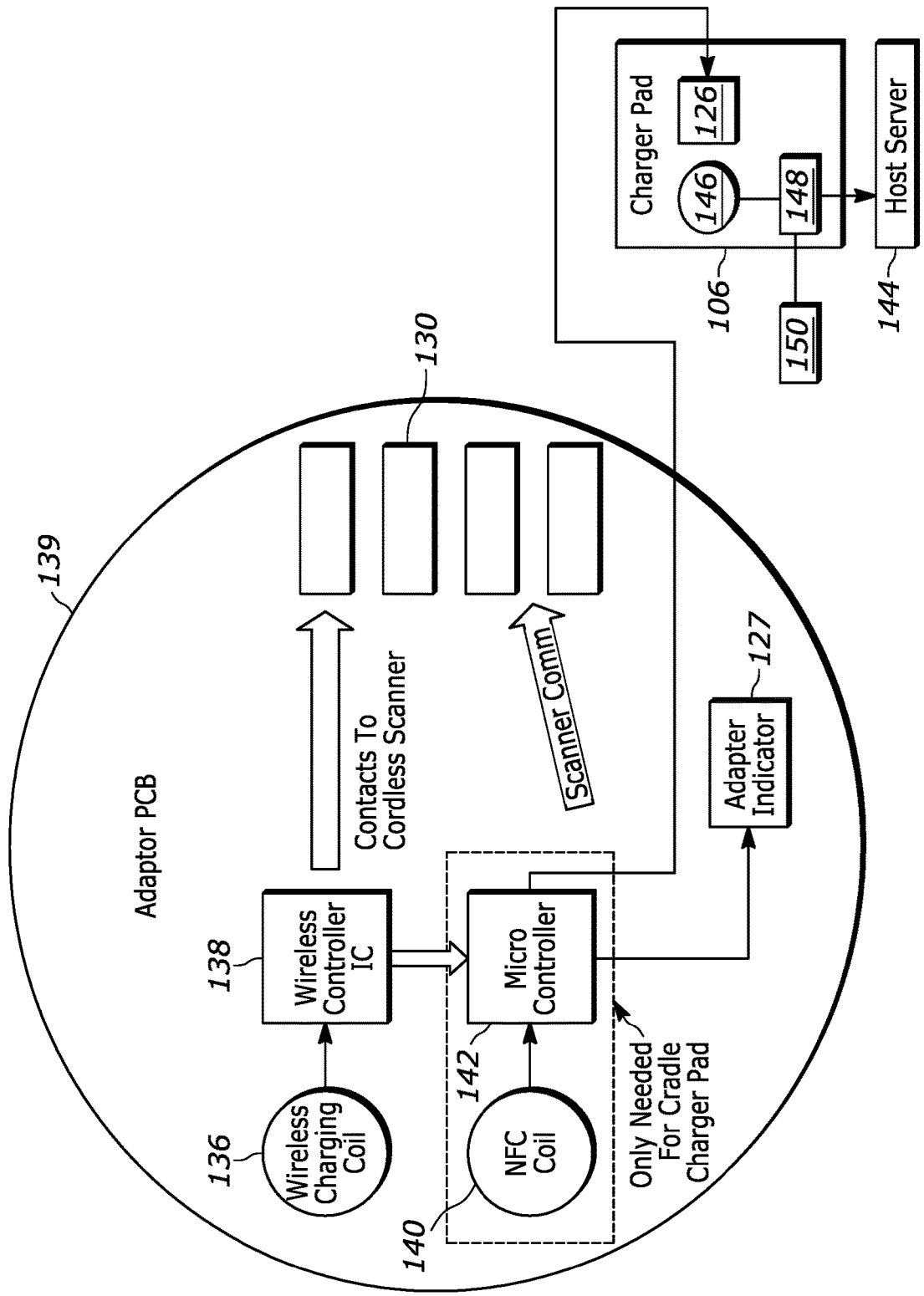
FIG. 5 depicts schematically a printed circuit board (PCB) of the adapter of FIGS. 1 and 2.

FIG. 5 shows schematically a printed circuit board (PCB) and networking system 139 for the adapter 104. In addition to the wireless charging receiver conductor 136, the adapter 104 may optionally include a near-field communication (NFC) conductor 140 positioned within the body 112. The NFC conductor 140 would only be used in an adapter 104 for a portable scanning system that included a cradle charging pad that provides data communication. In such an arrangement, the adapter 104 includes a microcontroller 142 that is in communication with the NFC conductor 140, the wireless controller 138, and the adapter electrical contact 130. The microcontroller 142 is configured to wirelessly communicate indicia data captured by the barcode reader 102 to an external receiver. In particular, the microcontroller 142 can provide pairing information provided by the barcode reader 102 to a charge pad 106 in order to enable Bluetooth communication between the charge pad 106 and the barcode reader 102. The charge pad 106 may in turn be connected to a host server 144 through one or more interfaces. In this way, via a Bluetooth connection established between the barcode reader 102 and the charge pad 106 courtesy of the indicia date provided by the adapter 104, the barcode reader 102 can update the host server 144 on critical information such as, for example, inventory supply.

In addition, the microcontroller 142 may be in communication with the adapter indicator 127 discussed above. The adapter indicator 127 may indicate a status that is one of: a successful pairing between the NFC conductor 140 and the charge pad 106, a failed pairing between the NFC conductor 140 and the charge pad 106, a successful Bluetooth connection between the portable barcode reader 102 and the charge pad 106, a failed Bluetooth connection between the portable barcode reader 102 and the charge pad 106, a level of charge of the adapter 104 and/or barcode reader 102, currently charging the adapter 104 and/or barcode reader 102, and not currently charging the adapter 104 and/or barcode reader 102.

As also shown in FIG. 5, the charge pad 106 may include a wireless charging transmitter conductor 146 and a power source connection 148. The barcode reader 102 is configured to be charged via direct charging between the reader electrical contacts 110 and the adapter electrical contacts 130, wireless charging between the wireless charging receiver conductor 136 and the wireless charging transmitter conductor 146, and direct charging between the charge pad 106 and a power source 150 by the power source connection 148. As discussed above, the charge pad 106 may include a pad indicator 126, which may be in communication with the microcontroller 142. The pad indicator may indicate a status that is one of: a successful pairing between the NFC conductor 140 and the charge pad 106, a failed pairing between the NFC conductor 140 and the charge pad 106, a successful Bluetooth connection between the portable barcode reader 102 and the charge pad 106, a failed Bluetooth connection between the portable barcode reader 102 and the charge pad 106, a level of charge of the adapter 104 and/or barcode reader 102, currently charging the adapter 104 and/or barcode reader 102, and not currently charging the adapter 104 and/or barcode reader 102.

Figure 6:
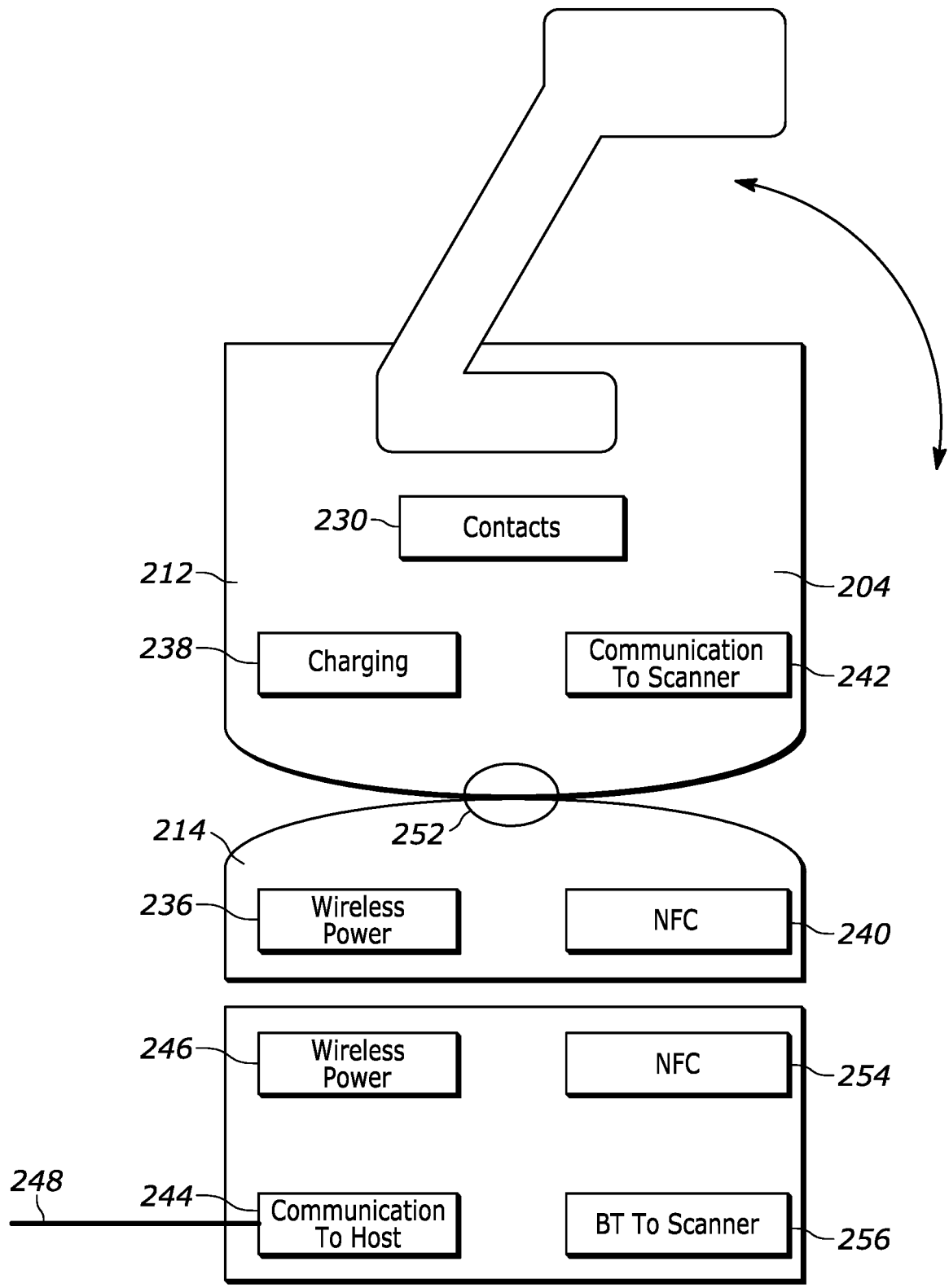
FIG. 6 illustrates a portable scanning system including a barcode reader, an adapter, and a charge pad, the adapter including an adjustable ratchet.

FIG. 6 illustrates an alternative arrangement of an adapter 204. It will be appreciated that the adapter 204 illustrated in FIG. 6 may include similar features to the adapter 104, and thereby elements illustrated in FIG. 6 are designated by similar reference numbers indicated on the embodiment illustrated in FIGS. 1-5, increased by 100. Accordingly, these features will not be described in substantial detail. Further, it is appreciated that any combination or sub-combination of features described in regard to the adapter 204 may be incorporated into the adapter 104, and vice-versa.

As shown in FIG. 6, the adapter 204 includes a ratchet 252 between the body 212 of the adapter 204 and the base 214 of the adapter 204. The ratchet 252 allows the central axis A of the FOV of the barcode reader 202 (when in the fastened state with the adapter 204) to be adjusted. While the central axis of the FOV of the barcode reader 202 may extend anywhere between a horizontal plane to a plane as much as 45 degrees below the horizontal plane when the base 214 is selectively placed on an external surface, such as the charger 206, a greater range may sometimes be preferred. That is, the barcode reader 202 can be tipped to adjust the central axis A of the FOV, and the ratchet 252 can secure the barcode reader 202 via the adapter 204 at the tipped position upon the external surface, such as the charger 206. The ratchet 252 allows the barcode reader 202 to be tipped such that the central axis of the FOV is outside the region between the horizontal plane and the plane 45 degrees below the horizontal plane, which may be desirable in certain unique circumstances.

In the arrangement shown in FIG. 6, the adapter electrical contacts 230, the wireless controller 238, and the microcontroller 242 (if present) are locate in the body 212 of the adapter 204 above the ratchet 252. The wireless charging receiver conductor 236 and the NFC conductor 240 (if present) are located in the base 214 of the adapter 204 below the ratchet 252. This enables the NFC conductor 240 (if present) and the wireless receiver conductor 236 to be adjacent to the wireless charging transmitter conductor 246 of the charge pad 206, as well as to an NFC conductor 254 of the charge pad (if present). The charge pad 206 maintains a power source connection 248, communication to a host server 244, and may further include Bluetooth capabilities 256 to communicate with the barcode reader 202.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An adapter for a portable barcode reader configured to capture at least one image of an object appearing in a field of view (FOV) having a central axis, the adapter comprising:
a body having a base for selective placement on an external surface, the body configured to fasten around a foot of the portable barcode reader to maintain the barcode reader in a stationary position when selectively placed on the external surface and such that the central axis of the FOV of the portable barcode reader extends anywhere between a horizontal plane to a plane as much as 45 degrees below the horizontal plane when the base is selectively placed on the external surface;
adapter electrical contacts contained within the body and positioned to be in continuous electrical contact with reader electrical contacts of the foot of the portable barcode reader when the body is fastened around the foot of the portable barcode reader;
a wireless charging receiver conductor positioned within the body and coupled to the adapter electrical contacts to provide inductively received power to the portable barcode reader; and
a wireless controller positioned within the body and in communication with the wireless charging receiver conductor and the adapter electrical contacts and configured to control charging of the portable barcode reader.

2. The adapter of claim 1, the body having a plurality of parts adapted to move between an open state, in which the plurality of parts are separated to enable the portable barcode reader to be inserted into the adapter, and a fastened state, in which the plurality of parts are secured around the portable barcode reader such that the adapter moves with the portable barcode reader during use.

3. The adapter of claim 2, the plurality of parts including a first half and a second half, an enclosure created between the first half and the second half in the fastened state, the enclosure having an enclosure geometry that is complementary to an exterior surface of the foot of the portable barcode reader.

4. The adapter of claim 2, the adapter further comprising a receptacle region within which any of a plurality of inserts may be placed, each insert being shaped to marry with a different foot geometry of the portable barcode reader, the insert securable within the body of the adapter and adjacent to an exterior surface of the portable barcode reader when the adapter is in the fastened state.

5. The adapter of claim 2, the adapter further comprising a seal engaged between the body of the adapter and the portable barcode reader when the adapter is in the fastened state.

6. The adapter of claim 1, the body of the adapter further including internal alignment structures that engage an exterior surface of the portable barcode reader to ensure proper placement of the portable barcode reader within the body of the adapter.

7. The adapter of claim 1, the base comprising a bottom that is selectively placed on the surface and an adjustable ratchet by which the FOV of the portable barcode reader can be adjusted when the base is selectively placed on the surface by changing an angle between the bottom and the surface.

8. The adapter of claim 1, wherein the adapter further comprises a near-field communication (NFC) conductor positioned within the body, and a microcontroller in communication with the NFC conductor, the wireless controller, and the adapter electrical contacts, the microcontroller configured to wirelessly communicate indicia data captured by the portable barcode reader to an external receiver.

9. The adapter of claim 1, wherein the base comprises a bottom that is contoured to be complementary to the surface upon which the base is configured for selective placement.

10. An adapter for a portable barcode reader configured to enable wireless charging and data transfer between the portable barcode reader and a charge pad, the adapter comprising a
a body having a base, the body configured to fasten to the portable barcode reader;
adapter electrical contacts contained within the body and positioned to be in continuous contact with reader electrical contacts of the portable barcode reader when the body is fastened to the portable barcode reader;
a wireless charging receiver conductor positioned within the body and coupled to the adapter electrical contacts to provide inductively received power to the portable barcode reader;
a wireless controller positioned within the body and in communication with the wireless charging receiver conductor and the adapter electrical contacts and configured to control charging of the portable barcode reader;
a near-field communication (NFC) conductor positioned within the body; and
a microcontroller positioned within the body and in communication with the NFC conductor, the wireless controller, and the adapter electrical contacts, the microcontroller configured to wirelessly communicate indicia data captured by the portable barcode reader to an external receiver.

11. The adapter of claim 10, the adapter further comprising an adapter indicator in communication with the microcontroller, the adapter indicator configured to provide at least one of a visual signal and audial signal regarding a status of the adapter.

12. The adapter of claim 11, wherein the status is one of: a successful pairing between the NFC conductor and the charge pad, a failed pairing between the NFC conductor and the charge pad, a successful Bluetooth connection between the portable barcode reader and the charge pad, a failed Bluetooth connection between the portable barcode reader and the charge pad, a level of charge, currently charging, and currently not charging.

13. A portable scanning system, the system comprising:
a barcode reader having reader electrical contacts;
an adapter having
a body configured to fasten to the barcode reader,
adapter electrical contacts contained within the body and positioned to be in continuous contact with the reader electrical contacts of the barcode reader when the body is fastened to the barcode reader,
a wireless charging receiver conductor positioned within the body and coupled to the adapter electrical contacts to provide inductively received power to the barcode reader, and
a wireless controller positioned within the body and in communication with the wireless charging receiver conductor and the adapter electrical contacts and configured to control charging of the barcode; and
a charge pad having a wireless charging transmitter conductor and a power source connection,
the barcode reader configured to be charged via direct charging between the reader electrical contacts and the adapter electrical contacts, wireless charging between the wireless charging receiver conductor and the wireless charging transmitter conductor, and direct charging between the charge pad and a power source by the power source connection.

14. The portable scanning system of claim 13, wherein the charge pad is a Qi pad.

15. The portable scanning system of claim 13, wherein the adapter further comprises a near-field communication (NFC) conductor positioned within the body, and a microcontroller in communication with the NFC conductor, the wireless controller, and the adapter electrical contacts, the microcontroller configured to wirelessly communicate indicia data captured by the barcode reader to an external server.

16. The portable scanning system of claim 15, wherein the charge pad comprises a pad indicator, the pad indicator configured to provide at least one of a visual signal and audial signal regarding a status of the portable scanning system.

17. The portable scanning system of claim 16, wherein the status is one of: a successful pairing between the NFC conductor and the charge pad, a failed pairing between the NFC conductor and the charge pad, a successful Bluetooth connection between the barcode reader and the charge pad, a failed Bluetooth connection between the barcode reader and the charge pad, a level of charge, currently charging, and currently not charging.

18. The portable scanning system of claim 13, wherein the charge pad comprises physical or visual guides to direct placement of the adapter on the charge pad.

19. The portable scanning system of claim 13, wherein the charge pad is connected to a host server through one or more interfaces.

* * * * *